Oct. 26, 1948.　　　　　J. N. CANDLER　　　　　2,452,355
TORQUE CONTROL FOR HELICOPTERS
Filed Sept. 11, 1944　　　　　　　　　　　　2 Sheets-Sheet 2
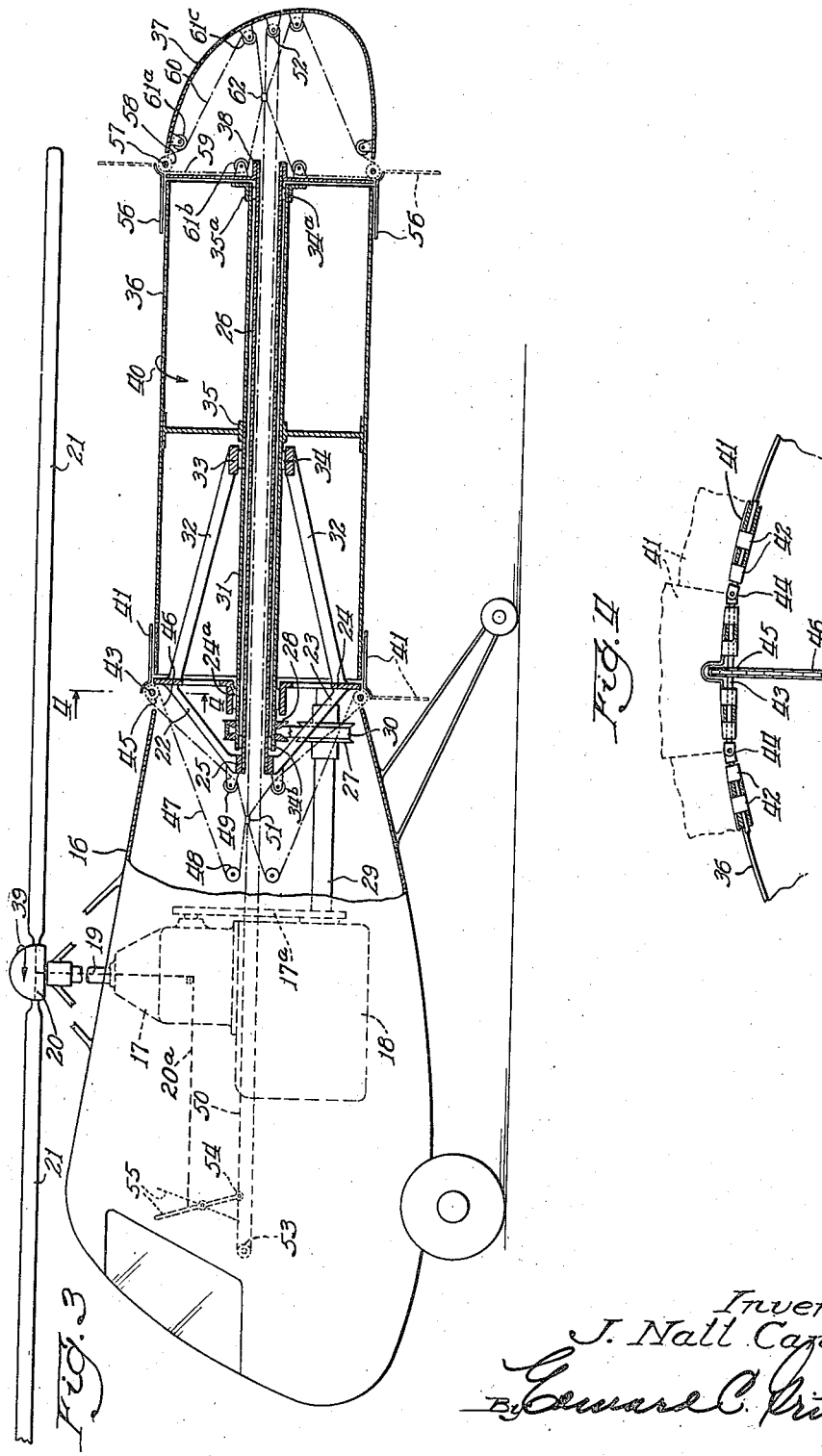

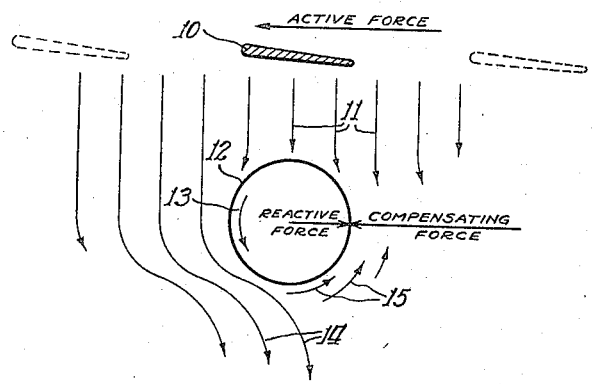
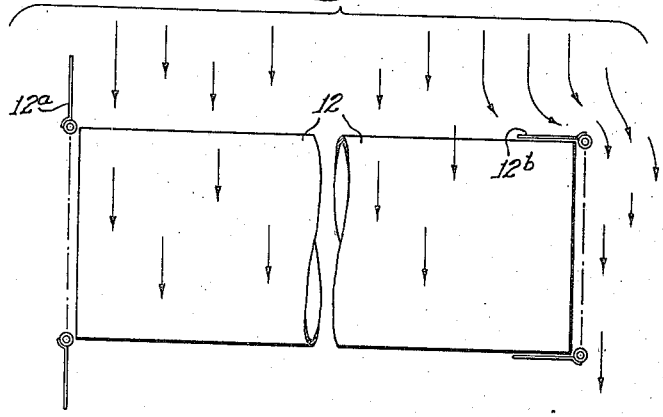
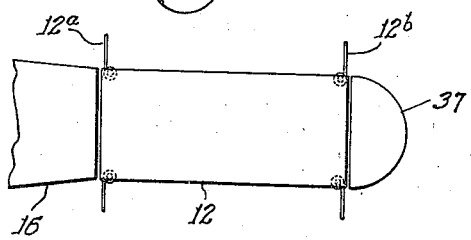

Patented Oct. 26, 1948

2,452,355

UNITED STATES PATENT OFFICE 2,452,355

TORQUE CONTROL FOR HELICOPTERS

James Nall Candler, Grosse Pointe, Mich., assignor to Borg-Warner Corporation, a corporation of Illinois Application September 11, 1944, Serial No. 553,510

14 Claims. (Cl. 244—17)

This invention relates to helicopters and particularly to means for controlling flight thereof.

In a helicopter wherein a power-driven vaned rotor or propeller is rotated around a vertical axis for sustaining and propelling the helicopter, a torque reaction is produced upon the fuselage of the helicopter by such driving means, the reaction torque tending to rotate the fuselage around the vertical axis in a direction opposite to that in which the rotor or propeller is driven. The reaction torque may be controlled by means of a variable pitch propeller operating around a horizontal axis disposed transversely of the fuselage. To avoid interference with the sustaining rotor, the compensating variable pitch propeller, or tail rotor as it is sometimes called, is mounted on a stern or aft boom which extends beyond the lifting or sustaining rotor to position the compensating propeller beyond the down stream created by the sustaining rotor. As this compensating propeller is not shielded it causes a drag and loss of power or speed of the aircraft, and it also constitutes a hazard to persons in the vicinity of the helicopter when the latter is on the ground and is about to take off. Furthermore, in order to have the tail rotor operate free of the sustaining rotor, the length of the fuselage must be unnecessarily increased, thereby increasing the weight of the fuselage, and the size of the space in which the vehicle can be landed.

The principal object of this invention is to provide a torque compensating rotor for a helicopter which will not be hazardous to those in the vicinity thereof; which is constructed and operates on the principle of the Flettner rotor and which provides at least a portion of the tail of a helicopter.

Another principal object of this invention is to provide a tail rotor for a helicopter which is not adversely affected by the slip stream produced by the sustaining rotor, and, in fact, utilizes the slip stream for the development of the required compensating torque. For accomplishing this a horizontally disposed cylindrical rotor is mounted in the path of the slip stream or down current from the propeller to produce a Magnus effect for creating a torque counter-acting the torque of the main propeller. A related object is the provision of a tail rotor which enables the fuselage of the helicopter to be shortened to such an extent that it does not extend materially beyond the tips of the rotating blades of the sustaining rotor.

Another object of this invention is a provision of a torque compensating device for a helicopter which is more efficient than the variable pitch propeller heretofore used and hence will require less power to operate, thereby making available more power to raise and propel the helicopter for the same size power plant.

Still another object of this invention is to provide a torque compensating means for a helicopter which may be made to assume the streamlined shape of the fuselage of the helicopter.

Also it is an object of this invention to provide devices coacting with suitable torque counterbalancing means for creating a drag or brake on the fuselage for effecting a hovering action of the helicopter and for assisting the helicopter in vertical flight.

An important object of this invention is to provide a torque compensator in the form of the well-known Flettner type of rotor arranged to produce the Magnus effect, and to provide controllable means that coact with the rotor for preventing the spilling of the air at the ends of the rotor whereby the effective length of the torque control is equal to the length of said rotor.

In connection with the foregoing object, the means for preventing the spilling of the air current from the ends of the rotor comprise a plurality of flaps arranged adjacent the ends of the rotor and adapted to be moved into active and non-active positions with respect to the rotor. This arrangement is especially advantageous in a helicopter because the flaps may be positioned in their non-active or retracted positions during ordinary flight, or the flaps may be projected into their active positions beyond the surface of the cylindrical rotor for climbing. The opened flaps also will exert a drag or brake upon the helicopter that is particularly effective when the aircraft is hovering, or slowing down to a hovering condition for when it is approaching a landing.

A still further object hereof is to provide controllable means for a Flettner type of rotor whereby the length of the effectiveness of such rotor is equal to the length of the rotor.

Other objects, aims and advantages of the invention contemplated herein will be apparent to persons skilled in the art after the construction and operation of the torque control arrangement is understood from the within description.

It is preferred to accomplish the numerous objects of this invention and to practice the same in substantially the manner hereinafter fully described and as more particularly pointed out in the appended claims. Reference is now made to the accompanying drawings that form a part of this specification, in which Fig. 1 is a diagram illustrating the principle upon which the improved torque compensating means is based;

Fig. 2 is another diagram looking at a side of the arrangement shown in Fig. 1;

Fig. 3 is an elevation partly in section of a helicopter showing the improved torque control installed thereon;

Fig. 4 is a fragmentary vertical section taken along the plane of line 4—4 on Fig. 3; and Fig. 5 is a fragmentary diagrammatic view showing a modified arrangement of the present invention.

The drawings are to be understood as being more or less of a schematic character for the purpose of disclosing typical or preferred forms of the improvements contemplated herein, and in these drawings like reference characters identify the same parts in the different views.

Broadly speaking the improved torque compensating means utilizes the principle of the well-known Flettner rotor for producing a Magnus effect. According to the Magnus principle a cylindrical body rotating in a stream of air will create a pressure on one side where the surface of the body rotates against the direction of movement of the air, and a partial vacuum diametrically opposed to the pressure side. This Magnus effect produces a force tending to move the rotating cylinder cross-wise of the moving stream of air.

Referring to Fig. 1, let it be assumed that 10 is a blade or fan which is either curved or in some manner pitched so that when it passes through air in the manner and direction shown in Fig. 1 it will create a stream of air moving downward as shown by the arrows 11. If the angle of incidence of blade 10 is constant and the direction of movement is in a straight line, the flow of air will be along substantially parallel lines and at right angles to the direction of movement of the blades, assuming that no disturbing factors are present. Now let it be assumed that a cylinder 12 is placed in the moving stream of air with its axis at right angles to the general direction of movement of the air, and that the cylinder is driven by suitable power means in the direction of the arrow 13. The skin friction of the surface of cylinder 12 moving in the stream of air will tend to pull particles of the air around with it, and this tendency will result in a disturbance in the air stream, such as shown by the arrows 14 and 15. The air to the left (Fig. 1) of cylinder 12 will be drawn toward the cylinder and carried around with it until it meets the air coming downward to the right of the cylinder. The two air streams coming together will create a region of high pressure on the righthand side of cylinder 12 and the air drawn towards cylinder 12 on the lefthand side thereof will be at subatmospheric pressure, thereby creating a net force on cylinder 12 in a direction to move the cylinder to the left (Fig. 1). Obviously by varying the speed of rotation of the cylinder, the value of the force produced can likewise be varied. As shown in Fig. 2, by placing disks, transverse or lateral flanges, or similar elements 12a and 12b adjacent the ends of cylinder 12 the air current is prevented from spilling longitudinally over the ends of the cylinder so that the width of the air current that is effective upon the cylinder is equal to the length of the cylinder. These elements 12a and 12b may be mounted directly upon the ends of the cylinder 12 or they may be supported independent thereof, and in either case they are adjacent the ends of the cylinder to confine the flow of the air stream therearound.

In the diagram, the elements 12a and 12b comprise a plurality of flaps having hinged mountings whereby they may be moved into active positions where they project laterally to the cylinder as shown at 12a at the left end of Fig. 2, or they may be retracted into inactive positions where are substantially concentric to the surface of the cylinder as shown at 12b at the right end of Fig. 2. Also the flaps may be moved to other desired positions with respect to the fuselage.

It is known that the slip stream produced by the sustaining rotor blades of a helicopter is very substantial and that the movement of the blades through the air corresponds quite closely to the movement of the theoretical blade 10 of Fig. 1. If, therefore, a cylinder is placed in this slip stream, the cylinder being secured to the fuselage and driven by a suitable means so as to simulate cylinder 12, a torque is produced on the fuselage of the helicopter which tends to balance the reaction torque of the rotating sustaining blades. Furthermore, if retractable flaps 12a and 12b are hingedly mounted adjacent the ends of the cylinder 12 they may be utilized for the purpose of controlling the helicopter in flight and serve to increase the effectiveness of the torque compensating means and add to its functions. Thus, in forward flight of the aircraft the flaps are retracted or inactive since the torque compensating requirements are materially reduced due more or less to the fin area of the tail section of the fuselage and very little drag would be induced. However, in approaching and while in a hovering position the flaps would be opened thus establishing an effective disk adjacent each end of the rotor 12, allowing a maximum reactive force to be produced on the cylinder surface. Inasmuch as there is little or no flight in either direction when the helicopter is hovering, there is no detrimental drag effect produced by the opened or actively positioned flaps. When the helicopter is climbing vertically or maintaining a hovering position, the pitch of the flaps is increased to the maximum position. Such being the case, the flaps, if desired, may be operated by the universal pitch control mechanism for the main propeller or blades 10 that create the down stream or air current, so that the flaps will open as the blade pitch increases from the normal flying pitch to the climbing or hovering pitch. Opening the flaps during flight produces an effective braking medium that materially assists in bringing the aircraft to a stop in mid-air prior to and while hovering, or for making a vertical landing.

Referring now to Fig. 3 wherein one means for taking advantage of the Flettner principle in a helicopter is disclosed, 16 is a helicopter fuselage body portion in which is mounted a suitable transmission 17 (shown diagrammatically in dotted outline) which is driven by a motor 18 and effects torque multiplication and speed reduction. The output shaft 19 of transmission 17 is connected, through a universal pitch control mechanism 20, to and is effective for operating a plurality of blades 21 of a sustaining rotor or overhead propeller in a manner to rotate them in a plane substantially at right angles to the axis of shaft 19.

The fuselage body 16 is provided with a plurality of converging struts 22 and 23 which are secured to and extend forwardly from a ring 24 of the frame forming part of fuselage section 16. Said struts 22 and 23 are connected at their proximate ends to a sleeve 25 for supporting a non-rotatable hollow shaft 26 that is anchored to the sleeve in any suitable manner. The anchoring sleeve 25 is spaced from ring 24 and in the space so formed there is a pair of pulleys 27 and 28, pulley 28 being concentric with stationary shaft 26 and pulley 27 being mounted on a shaft 29 which may be driven by a belt 17a from a suitable take-off mechanism incorporated in transmission 17. A V-belt 30 connects pulleys 27 and 28 so as to drive pulley 28 from pulley 27. It is contemplated that pulleys 27 and 28 will be arranged to provide a variable speed ratio drive between shaft 29 and pulley 28 so that pulley 28 may be driven at different speeds with respect to pulley 27.

Pulley 28 is anchored to and drives a hollow shaft 31 which is concentric with or telescopically mounted on stationary shaft 26. Hollow shaft 31 passes through the hub of ring 24 and has anti friction bearing 24a therein. A plurality of converging struts 32 extend rearwardly from the fuselage ring 24 and are connected at their proximate ends to a sleeve 33 enclosing an antifriction bearing 34 for journaling the adjacent portion of the rotatable tubular shaft 26 that extends therethrough. Thus the struts 22, 23 and 32 provide a rigid cantilever support for the inner stationary shaft 26 and the outer rotatable shaft 31. As seen in Fig. 3 these telescoped shafts project rearward a considerable distance beyond the bearing sleeve 33 and at their rear ends have antifriction bearings 34a between them, while the shaft 26 has a rear hub 35a of a cylindrical rotor 36 secured to it. Similar antifriction bearings 34b are interposed between the shafts at the forward end of rotatable shaft 26.

Splined to shaft 31 adjacent sleeve 33 is a hub member 35 of the cylindrical rotor 36, said rotor having a surface for producing suitable skin friction. Said rotor 36 is of a shape which is preferably a continuation of the shape of fuselage body portion 16 at ring 24 but may be tapered or of other suitable shape. It has been found that skin friction does not vary greatly with different types of surfaces and for purposes of illustration therefor the surface is shown to be a regular cylindrical surface. The rotor 36 produces a Magnus effect and it is driven by the motor that actuates the vertical shaft of the horizontal propeller 21 so that it turns at a suitable speed. With an increase of rotational speed of the propeller with a resulting torque increase on the fuselage, the Magnus effect or counteracting torque is automatically and correspondingly increased.

The right hand or rear end (Fig. 3) of shaft 26 that projects beyond shaft 31 supports streamlined cap or terminal member 37 which closes off the end of rotor 36 and has a hub 38 that is secured to stationary shaft 26. Said cap member 37 is preferably stationary since it is outside the slip stream of the sustaining rotor and hence is not effective aerodynamically.

Assuming that the sustaining rotor or propeller 21 rotates in the direction of the arrow 39 and that rotor 26 turns in the direction of arrow 40, it will be apparent that the conditions present in the helicopter of Fig. 3 are identical with those of the theoretical conditions illustrated in Fig. 1 and that therefore the reaction torque on the fuselage 16 will be balanced by the pressure produced on the back (Fig. 3) (hidden) portion of cylinder 36. By varying the speed of rotor 36 relative to the speed of sustaining rotor 21 through the adjustable pulleys 27 and 28, the torque compensating effect on the fuselage may likewise be varied and a turning movement of the fuselage may be effected in either direction. Thus the rotor 36 provides the full equivalent of the rotating variable pitch tail propeller of the prior helicopter design. The diameter of rotor cylinder 36 is preferably made the same as the diameters of the fuselage and cap adjacent the ends of the cylinder to effect a streamlining of the tail portion of the fuselage the major portion of which, or at least the rotor cylinder 36, is in the influence of the down current of air created by the propeller 21.

The power necessary to operate the type of rotor shown herein is substantially less than the power required to operate the ordinary type of tail rotor, and in addition the present arrangement shortens the overall length of the helicopter since it dispenses with the elongated boom upon which the tail rotor has heretofore been mounted.

Controllable means are provided to insure a fully effective portion of the air current coming into engagement with the cylindrical rotor 36, and to accomplish this function suitable elements are mounted adjacent the ends of said rotor cylinder for the purpose of preventing the air current being spilled beyond this torque compensating rotor. The means in question may be adjustable plates, flanges, flaps and like members that are adapted to be projected outwardly from the circumference of the torque rotor. These members may be carried by and rotate with the torque rotor, or they may be mounted upon stationary proximate portions of the fuselage 16 and end cap 36. Also these members when projected in an active position are adapted to exert a drag or brake upon the helicopter when hovering or when approaching a landing, or for vertical flight.

For the purpose of disclosing a typical embodiment of the controllable means, they have been shown herein as comprising a plurality of adjustable flaps 41 that are swingingly mounted on the fuselage and end cap adjacent the forward and aft ends of the torque control rotor 36. These flaps 41 comprise suitably shaped rectangular plates of arcuate cross-section the curvature of which conforms to a segment of the cylinder forming the torque rotor 26 with which the flaps are concentrically disposed when they are in their inactive positions as shown at the right hand end of Fig. 2. When in their active position these flaps project radially or transversely to the surface of the torque rotor in the manner shown at the left hand end of Fig. 2.

In the assembly shown at the left end of the rotor 16 in Fig. 3, the basal margins of the flaps 41 have hinge knuckles 42 secured to rock spindles 43 rotatably mounted on a convenient portion of the frame ring 24. Adjacent ends of rock spindles are operatively connected by suitable means such as universal joints 44 to simultaneously rock said spindles for positioning the flaps. The master or actuator spindle carries a sprocket 45 on which a chain 46 is trained and the ends of this chain are secured to the ends of an operating wire 47 which in turn is trained on guide pulleys 48 and 49 and is attached between said pulleys to an elongated control cable 50 by a suitable coupling 51. The control cable 50 is an endless loop that passes through the hollow stationary shaft 26 with its rear portion trained on a pulley 52 at the rear of the cap member 37. The forward portion of the control cable extends into the operator's cab of the fuselage 16 where it is trained on a pulley 53 and is coupled by a link or other suitable device 54 to the lower swingable end of a lever 55 whereby the cable may be readily operated to move the flaps 41 into active or inactive positions with relation to the ends of the torque control rotor or cylinder 36. For the purpose of synchronizing the positioning of the flaps 36 with respective pitching of the main propeller blades 21, the control lever 55 may be the element that operates the universal pitch control mechanism 20, through the medium of a suitable connection 20a, or it may be independent thereof.

A plurality of flaps 56 are hingedly mounted adjacent the aft or trailing end of torque reacting rotor 36 to function in the same manner as the other flaps 41. The aft flaps are carried upon rock spindles 57 journaled preferably upon the proximate portion of the end cap 37 and are connected by universal joints (not shown) in the same manner as the forward spindles 43 are connected for simultaneous operation. Preferably one of these spindles is a master spindle carrying a sprocket 58 that is actuated by a chain 59 having its ends connected to operating wire 60 that is trained upon pulleys 61a, 61b and 61c mounted within the tail cap 37, and intermediate pulleys 61b and 61c this wire is attached to a coupling 62 in the adjacent portion of the control cable 50.

By the employment of the above described instrumentalities for operating the flaps they have synchronized movement with respect to the universal pitch control of the propeller blades, and the two groups of flaps are operated simultaneously to move them into active and inactive positions, either projecting lateral or radial to the surface of rotor 36 as shown at the left in Fig. 2, or retracted to lie flat in concentric relation to the rotor surface as shown at the right in Fig. 2.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

The rotor described above is not hazardous to persons in the vicinity of the helicopter and it reduces the length of the helicopter materially. The power requirements for balancing and turning the helicopter are also substantially reduced, in this manner making more power available for lifting and propelling the ship.

I claim:

1. In a device adapted to operate in a fluid, means reacting against the fluid for propelling or controlling the movement of the device through the fluid, said means when in operation creating a turning moment on the device and a movement of the fluid; means responsive to the movement of the fluid to produce a Magnus effect for balancing the aforesaid turning moment; and controllable pivoted means coacting with said balancing means adapted for movement to active and inactive positions and adapted when in said active position to define the limits of the Magnus effect thereon.

2. In a device adapted to operate in a fluid, a rotating blade on the device to provide a thrust for propelling or controlling the movement of the device through the fluid; means responsive to the slip stream developed by the rotation of the blade in the fluid to produce a Magnus effect for balancing the aforesaid reaction torque of the blade on the device; and pivoted devices movable into active and inactive positions with respect to said balancing means, said devices in an active position being adapted to define the limits of the Magnus effect on said balancing means.

3. In an aircraft, a rotatable blade; means for driving the blade to propel or control the movement of the aircraft, said driving means reacting upon the aircraft to tend to turn said aircraft in a direction opposite to that of the blade; and means responsive to the slip stream developed by the blade for balancing the turning reaction, said slip stream responsive means being constructed and arranged to produce a Magnus effect and including pivoted controllable devices movable into active and inactive positions at least one of said positions being adapted to define the limits of the Magnus effect.

4. In an aircraft, a rotatable blade; means for driving the blade to propel or control the movement of the aircraft, said driving means reacting upon the aircraft to tend to turn said aircraft in a direction opposite to that of the blade; elongated means dependent primarily upon skin friction and mounted in the slip stream developed by the blade for balancing the turning reaction; and adjustable devices entirely disposed adjacent the respective ends of said elongated means, said devices fulcrumed for movement to active and inactive positions to modify the effectiveness of the slip stream upon said elongated means.

5. The combination in an aircraft as described in claim 4, said elongated means comprising a drum rotatable around an axis disposed transversely of the slip stream.

6. The combination in an aircraft as described in claim 4, said elongated means comprising a drum rotatable around an axis disposed transversely of the slip stream, and means for rotating the drum about its axis in a direction to provide a Magnus effect producing a torque opposing the turning tendency of the aircraft.

7. The combination in an aircraft as described in claim 4, said last-mentioned means comprising a drum rotatable around a support which is fixed to the aircraft and disposed transversely of the slip stream.

8. A helicopter comprising a fuselage; a propeller above said fuselage rotatable on a vertical axis to propel or control the movement of the helicopter; a horizontal cylindrical rotor in the down current from said propeller for effecting a torque counteracting the torque created on said fuselage by said propeller; and flaps movably mounted adjacent the ends of said rotor, said flaps being constructed and arranged to be active when positioned radial to said rotor for confining the down current that is effective on said rotor throughout the length thereof, said flaps also adapted to be moved to inactive positions approximately axial of said rotor.

9. A helicopter comprising a fuselage; a propeller above said fuselage rotatable on a vertical axis to propel or control the movement of the helicopter; a horizontal cylindrical rotor in the down current from said propeller for effecting a torque counteracting the torque created on said fuselage by said propeller; flaps adjacent the ends of said rotor; spindles mounting said flaps for swinging movement to position said flaps lateral to the circumference of said rotor for exerting a drag upon the helicopter during approximately forward and rearward flight; means connecting said flaps for simultaneous operation; and means for operating said flaps whereby to move them into inactive positions axially of said rotor.

10. A helicopter comprising a fuselage; a propeller above said fuselage rotatable on a vertical axis to propel or control the movement of the helicopter; universal pitch control means for said propeller; a horizontal cylindrical rotor in the down current from said propeller for effecting a torque counteracting the torque created on said fuselage by said propeller; swinging flaps adjacent the ends of said rotor, said flaps being connected for movement to active positions for exerting a drag on the helicopter; and common means for simultaneously operating said universal pitch control mechanism and said flaps whereby said flaps are moved into inactive positions with respect to said rotor.

11. A helicopter comprising a fuselage; a propeller above said fuselage rotatable on a vertical axis to propel or control the movement of the helicopter; a horizontal cylindrical rotor in the down current from said propeller for effecting a torque counteracting the torque created on said fuselage by said propeller; flaps adjacent the ends of said rotor; rock spindles mounting said flaps for swinging movement to position them respectively radially to or axially with respect to said rotor; an elongated control member extending longitudinally through said rotor; means operatively connecting said spindles to said control member for simultaneously adjusting the positions of said flaps with respect to said rotor; and means for reciprocably moving said control member.

12. A helicopter comprising a fuselage body portion; a propeller above said fuselage body rotatable on a vertical axis to propel or control the movement of the helicopter; a horizontal cylindrical rotor providing a streamline tail portion of said fuselage, said rotor being positioned in the down current from said propeller for effecting a torque counteracting the torque created on the fuselage by said propeller; a streamline cap at the aft end of said rotor; separate annular groups of flaps adjacent the ends of said rotor; means for adjustably mounting the groups of flaps respectively on the fuselage body portion and the cap; an elongated control member extending longitudinally of said fuselage body portion, said rotor and said cap, said member adapted for longitudinal reciprocatory movement; means operatively connecting said control member to the flap mounting means on said fuselage body portion; means operatively connecting said control member to the flap mounting means on said cap; and a lever for reciprocating said control member to successively position said flaps radial to said rotor and axially with respect thereto.

13. In a helicopter, a fuselage, a rotor for sustaining the helicopter in the air; a second rotor operating in and disposed transversely of the slip stream of the first-mentioned rotor and having a contour which is an extension of the contour of the fuselage, said second rotor constructed and arranged to provide a Magnus effect counteracting the reaction torque of the first rotor on the fuselage and controlling the turning movements of the fuselage around the axis of the first rotor; and adjustable means entirely disposed adjacent the respective ends of said second rotor, said adjustable means being movable into active and inactive positions at least one of said positions being adapted to define the limits of the Magnus effect.

14. A helicopter comprising a fuselage; a propeller above said fuselage for sustaining the helicopter in flight; rotor means operating in the slip stream produced by said propeller and comprising an extension of said fuselage; a stationary streamlined cap for said rotor means; the contours of said fuselage, rotor means and cap being approximately continuous; power means for driving said propeller and said rotor means, the skin friction produced by said rotor means developing a force which counterbalances the reactive force of said propeller on said fuselage; adjustable means adjacent the ends of said rotor means for effecting a drag during approximately forward or rearward flight of the helicopter, said adjustable means comprising a plurality of flaps hingedly mounted on said fuselage and said cap; and devices for simultaneously moving said flaps into active and inactive positions with relation to said rotor means.

J. NALL CANDLER.

REFERENCES CITED

The following references are of record in the file of this patent:

UNITED STATES PATENTS

| Number | Name | Date |
|---|---|---|
| 1,640,891 | Fritzel | Aug. 30, 1927 |
| 1,674,169 | Flettner | June 19, 1928 |
| 1,909,845 | Nagler et al. | May 16, 1933 |
| 1,927,535 | Zaparka | Sept. 19, 1933 |
| 2,065,254 | Wander | Dec. 22, 1936 |
| 2,318,260 | Sikorsky | May 4, 1943 |
| 2,353,303 | Gray | July 11, 1944 |